Feb. 7, 1950 V. J. DANIELS 2,496,445
LOADING RAMP
Filed Aug. 11, 1948
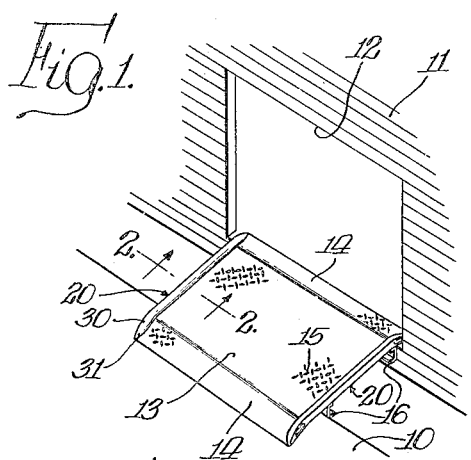
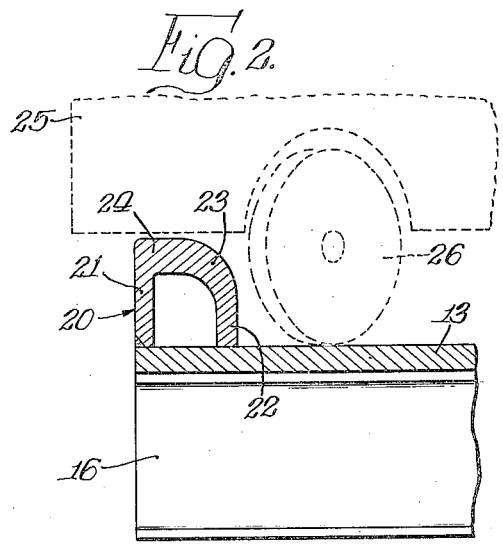
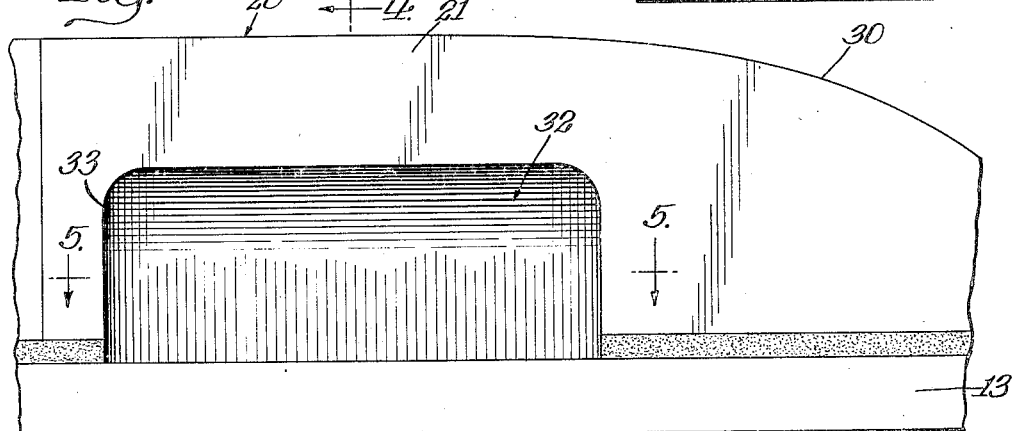
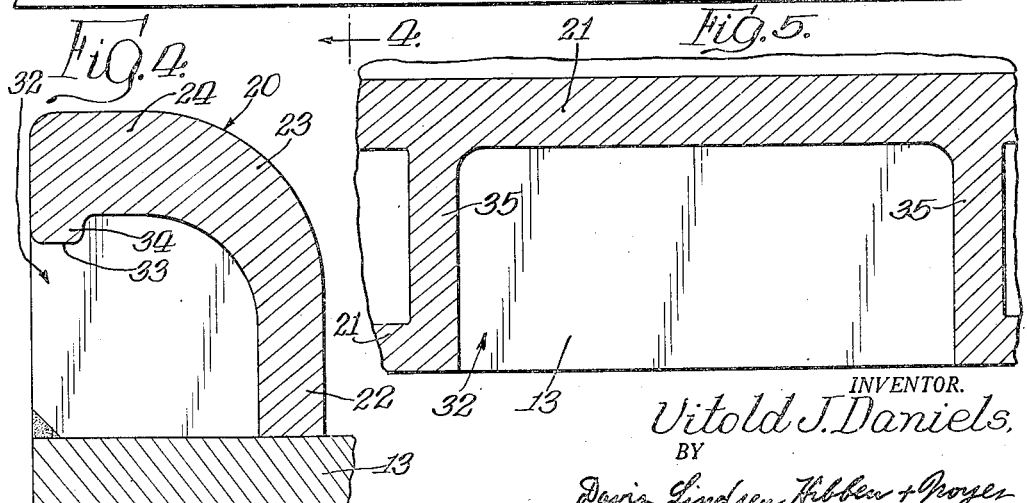
INVENTOR.
Vitold J. Daniels,
BY
Davis, Lindsey, Hibben + Noyes
Attys.

Patented Feb. 7, 1950

2,496,445

UNITED STATES PATENT OFFICE 2,496,445

LOADING RAMP

Vitold J. Daniels, Des Plaines, Ill., assignor to Magnesium Company of America, East Chicago, Ind., a corporation of Illinois Application August 11, 1948, Serial No. 43,662

2 Claims. (Cl. 14—72)

The invention relates to a loading ramp of the type adapted to provide a runway for trucks between a loading platform and a freight car or other vehicle, or between two freight cars or two motor trucks or for unloading trucks and trailers.

The general object of the invention is to provide a novel loading ramp of the foregoing character, which is of light weight and usually is handled by one man, and at the same time has sufficient strength to support relatively heavy loads.

Another object is to provide a novel loading ramp of the foregoing character, which is provided with means to prevent trucks from running off at the sides of the ramp, but with a minimum of interference with turning maneuvers of trucks passing thereover.

A further object is to provide a novel loading ramp of the foregoing character, having no sharp corners capable of cutting a workman by accidental contact therewith, and having no portions in such position that, when gouged or chipped by a truck and left with a sharp edge, they would be capable of cutting a workman or causing damage to rubber tires.

Still another object is to provide a novel loading ramp made of a non-sparking material so that, should it strike or be struck by a hard object, no spark will be generated, to eliminate explosion hazards of inflammable material carried thereover or spilled thereon.

Other objects and advantages will become apparent from the following description taken in connection with the accompanying drawings, in which:

Figure 1 is a perspective view of a loading ramp embodying the features of the invention and, by way of example, showing the ramp in position between a loading platform and a car door.

Fig. 2 is a fragmentary sectional view taken on the line 2—2 of Fig. 1.

Fig. 3 is an enlarged side elevational view of a corner portion of the ramp shown in Fig. 1.

Fig. 4 is a sectional view taken on the line 4—4 of Fig. 3.

Fig. 5 is a fragmentary sectional view taken on the line 5—5 of Fig. 3.

Loading ramps of the character herein contemplated are, as stated above, adapted to provide a runway for loading trucks between a loading platform and a freight car or motor vehicle, or between two cars. In early uses of loading ramps of this general character, only hand trucks were used to transport goods between a car and a loading platform, and consequently the loads carried were not great, since the extent of load was limited because of the hand operation. The loading ramps, therefore, did not require any great strength and frequently consisted in merely a flat steel plate adapted to be laid across the gap between the loading platform and the freight car or between two freight cars, as the case might be.

With the advent of power-operated loading trucks, much heavier loads could be carried, so that the ramps necessarily required greater strength to support such loads. A simple steel plate no longer was sufficient, since it would bend under such greater loads unless it were made of a thickness beyond reason. For such greater loads, the ramps were, therefore, designed with reinforcing portions to stiffen the ramp and prevent bending thereof under the loads to be carried. Such stiffening was usually effected by upstanding flange or rib portions along the two side edges of the ramp. Such ribs or flanges usually projected above the load carrying or floor surface of the ramp so as to provide guard rails at the side edges of the ramp to prevent trucks from accidentally running off the ramp.

In order to obtain sufficient strength for the ramp without making the floor portion thereof excessively thick, for carrying loads such as are encountered today, the guard rails at the sides required such height that they could be encountered or struck by body portions of the loading truck transported thereover or tractors used for pulling such trucks, so that they placed a restriction on turning maneuvers of the trucks and tractors. Furthermore, the weight of such loading ramps, when made of steel, was so great that if they were to be manually handled, more than one man would be required.

A loading ramp embodying the features of the present invention avoids many of these difficulties and yet has sufficient strength to support the loads normally encountered under present-day loading practices. To attain these ends, one of the fundamental features of the present loading ramp is that it is made of magnesium, rather than steel, so that its total weight is thereby greatly reduced. Magnesium, as is well known, has a weight which is only one fifth to one fourth that of steel and is even lighter than aluminum. However, it has sufficient strength so that the dimensions of the parts of the ramp do not have to be increased greatly over that required for a similar ramp made of steel. The result of making ramps of magnesium is that, even for the larger sizes, they are sufficiently light to permit handling by one man. Obviously, this is a definite advantage since a ramp of this character can be put in position for use by a man pulling a hand truck or the operator of a tractor or power truck, without calling for assistance from another man who may not be readily available at the moment.

Another advantage of a loading ramp embodying the invention is that the guard rails at the sides of the ramp are so constructed that they provide sufficient strength to support the loads encountered and prevent a truck from running off the ramp at the side, while their height is held to a minimum so as not to be capable of being encountered or struck by the body portion of any of the trucks normally utilized in this work. They thus provide for increased maneuverability of the trucks since such body portions, during the turning movements of the trucks and tractors, may be swung outwardly over the guard rails.

To illustrate the invention, I have shown in Fig. 1 of the drawings a loading platform 10 and a freight car 11 having a door opening 12. The loading ramp is adapted to rest on and bridge the space between the platform 10 and the floor of the car 11. Basically, the ramp comprises a floor plate 13 which is preferably tapered or slanted at its two end edges, as at 14, to facilitate movement of the loading trucks on and off the ramp without a jar. The top face of the floor plate is preferably roughened as at 15, by providing a pattern of raised portions, to give the wheels of the trucks or tractors sufficient traction without slipping. In the present instance, the floor plate is transversely stiffened by a pair of reinforcing members 16 projecting downwardly from the underside of the floor plate. The reinforcing members are illustrated as having the form of channels, with one flange of each channel secured to the underside of the floor plate, as by welding. The transverse reinforcing members 16 also function to properly locate the ramp relative to the loading platform 10 and the floor of the car so as to prevent the loading ramp from falling out of position. For this purpose, the reinforcing members 16 are spaced from the ends of the ramp so they will fit between the sides of the loading platform and freight car when the narrowest span is encountered. When the span is greater because of a narrower car, some lengthwise shifting would occur, but not enough to permit the ramp to fall out of position.

Along each of the side edges of the floor plate is a guard rail, indicated generally at 20. The guard rail 20 thus reinforces the floor plate 13 to prevent its bending under the load carried thereover. At the same time, the guard rails function to prevent trucks from running off of the floor plate at the sides. To provide sufficient strength in each guard rail and at the same time hold its height to a minimum, for purposes hereinafter explained, each rail comprises an outer vertically extending portion 21 and an inner vertically extending portion 22. The inner vertically extending portion 22 is preferably slightly thicker than the outer vertical portion 21 since the inner vertical portion is subjected to bumps from the wheels of the trucks and thus encounters wear and might be gouged or chipped by such bumps.

The inner vertical portion 22, at its upper end, curves outwardly as at 23 and blends into a top portion 24 connected at its outer edge to the outer vertical portion 21. The top portion 24 is preferably made thicker than both the vertical portions, since it functions to sustain a greater portion of the load placed on the floor plate 13. A structural shape is thus provided which has a maximum reinforcing characteristic for the floor plate 13 with a minimum of height in the guard rail.

With the foregoing construction of each guard rail, the overall height thereof above the top surface of the floor plate may be less than the clearance of the body portions of the trucks above the floor plate. Thus, in Fig. 2 I have illustrated in broken lines part of a truck comprising a body portion 25 and a supporting wheel 26. It will be noted from this figure that the body portion 25 clears the guard rail 20 and may swing thereover, the guard rail, of course, preventing the wheel 26 from running off the side of the ramp. In the handling of trucks and tractors, such a construction is of definite advantage as it increases the maneuverability of the truck when passing over or working adjacent the loading ramp since, when the truck is turning, a sharp turn may be accomplished when the body portion is permitted to swing outwardly over a guard rail. Each guard rail, at its ends, is curved downwardly, as indicated at 30 in Figs. 1 and 3, and outwardly, as indicated at 31 in Fig. 1, to facilitate movement of trucks onto the ramp without chance of striking a sharp or abrupt end on a rail.

As heretofore stated, the ramp of the present invention is made of magnesium so that it is sufficiently light in weight to permit handling by one man. To facilitate such handling, the ramp may be provided with hand holes which permit it to be easily grasped. Thus, each rail 20 adjacent its ends may be formed so as to provide a hand hole indicated generally at 32. Each hand hole 32 is also constructed so that a box hook, such as is used for handling wooden boxes, may be used to engage the ramp.

In the preferred construction, the outer vertical portion 21 of the rail, adjacent one end thereof, is interrupted, as at 33, for a portion of its length. An opening is thus provided into the interior of the rail to permit the insertion of the hand. The opening extends vertically for the major part of the vertical portion 21, but is terminated a short distance below the top portion 24 to leave a downwardly extending rib 34. Such rib facilitates grasping the ramp by the hand and also provides a ledge which may be engaged by the ordinary box hook. The ends of the hand hole 32 are closed by transversely extending walls 35 (see Fig. 5) so as to prevent moisture from gaining access to the interior of the side rail.

In manufacturing the loading ramp disclosed herein, the side rails for the major portion of their length are made of an extruded shape, since throughout such major portion each rail is of uniform cross-sectional dimension. The end portions of the side rails, because of the curved surfaces 30 and 31 and the hand holes 32, are preferably of cast metal. Both the extruded portion and the cast ends constituting these rails are welded to the floor plate where the vertical portions 21 and 22 contact the plate, and the abutting ends of the extruded portion and the cast end portions are similarly welded to each other.

With the foregoing structure, a ramp is provided which is so light in weight that it may be readily handled by one person. Still, in spite of its lightness, it is sufficiently rigid to support any of the loads to which an article of this character is subjected in present-day loading practice. The form of the side rails 20 sufficiently stiffens the floor plate and yet it has such a reduced height that the body portions of a truck or tractor can freely swing over in making turning maneuvers. The curved portion 23 of each rail avoids any sharp corners, against which a workman might injure his ankle, and even if the rail becomes chipped or gouged from misuse, any sharp edges resulting therefrom will be located below the top of a man's shoe, so that he cannot readily be injured thereby.

The use of magnesium also has an additional safety feature. Magnesium metal, when struck by a hard object, will not create sparks, as steel will, so that there is no danger of igniting inflammable materials spilled on the ramp.

I claim:

1. A loading ramp adapted to bridge a space between two disconnected floor surfaces, comprising a floor plate of substantially uniform thickness, and a pair of longitudinally extending guard rails extending along the upper face of said floor plate at the side edges thereof to prevent trucks from running off the sides thereof, said guard rails reinforcing said floor plate against bending along transverse lines under the weight of the trucks, each guard rail being of integral construction and comprising an outer vertical portion and an inner vertical portion laterally spaced from each other and the inner portion curving upwardly and outwardly to provide a top portion connected to the top of the outer portion, such curvature avoiding a sharp corner on the inner side of the rail which could be readily nicked, each of the vertical portions being secured to the floor plate and extending upwardly therefrom with the floor plate thereby rigidly connecting said vertical portions remote from said top portion and being rigidly reinforced thereby, said top portion being thickened to act as a reinforcing girder and resist compressive forces due to a load on the floor plate, the height of said top portion above the floor plate being less than the clearance of the body portions of the trucks above the floor plate whereby only the wheels of the trucks can contact said rails and the body portions can freely swing over the rails during turning movements.

2. A loading ramp adapted to bridge a space between two disconnected floor surfaces, comprising a floor plate and a pair of longitudinally extending guard rails extending along the upper face of said floor plate at the side edges thereof to prevent trucks from running off the sides thereof and to reinforce said floor plate against bending under the load of a truck, each guard rail comprising a pair of laterally spaced vertical portions connected by a top portion, with the vertical portions welded at their bottom edges throughout their length to the floor plate and each guard rail being closed at its ends, the outer vertical portion of each rail being interrupted adjacent one end to provide a hand hold, said top portion having a downwardly extending rib in the interruption to facilitate grasping by the hand and to provide for engagement by a hook, and a pair of partitions extending between said vertical portions and between said top portion and said floor plate at either side of each hand hold to close the interior of the guard rail against entrance of moisture to prevent corrosion of the guard rail.

VITOLD J. DANIELS.

REFERENCES CITED

The following references are of record in the file of this patent:

UNITED STATES PATENTS

| Number | Name | Date |
|---|---|---|
| 759,010 | Palmer | May 3, 1904 |
| 2,284,022 | Schmeller, Sr. | May 26, 1942 |
| 2,329,855 | Rydner | Sept. 21, 1943 |
| 2,461,678 | Christensen | Feb. 15, 1949 |
| 2,471,226 | Maccario | May 24, 1949 |

OTHER REFERENCES

Railway Age, page 556, March 15, 1947.